(12) United States Patent
Chatterjee et al.

(10) Patent No.: US 8,479,037 B1
(45) Date of Patent: *Jul. 2, 2013

(54) DISTRIBUTED HOT-SPARE STORAGE IN A STORAGE CLUSTER

(75) Inventors: Paresh Chatterjee, Fremont, CA (US); Ajit Narayanan, Fremont, CA (US); Anandh Mahalingam, Fremont, CA (US); Srikumar Subramanian, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,305

(22) Filed: Aug. 29, 2011

Related U.S. Application Data

(63) Continuation of application No. 11/551,311, filed on Oct. 20, 2006, now Pat. No. 8,010,829.

(60) Provisional application No. 60/728,453, filed on Oct. 20, 2005, provisional application No. 60/728,667, filed on Oct. 20, 2005, provisional application No. 60/728,680, filed on Oct. 20, 2005, provisional application No. 60/728,666, filed on Oct. 20, 2005.

(51) Int. Cl.
*G06F 11/00* (2006.01)

(52) U.S. Cl.
USPC .................................. 714/4.11; 714/6.23

(58) Field of Classification Search
None
See application file for complete search history.

(56) References Cited

U.S. PATENT DOCUMENTS

| | | | |
|---|---|---|---|
| 4,849,978 A | 7/1989 | Dishon et al. |
| 4,942,579 A | 7/1990 | Goodlander et al. |
| 5,257,367 A | 10/1993 | Goodlander et al. |
| 5,488,716 A | 1/1996 | Schneider et al. |
| 5,524,204 A | 6/1996 | Verdoorn, Jr. |
| 5,678,061 A | 10/1997 | Mourad |
| 5,720,027 A | 2/1998 | Sarkozy et al. |
| 5,732,238 A | 3/1998 | Sarkozy |
| 5,787,459 A | 7/1998 | Stallmo et al. |
| 5,790,774 A | 8/1998 | Sarkozy |
| 5,893,919 A | 4/1999 | Sarkozy et al. |
| 5,907,849 A | 5/1999 | Dias et al. |
| 5,974,426 A | 10/1999 | Lee et al. |
| 6,098,128 A | 8/2000 | Velez-McCaskey et al. |

(Continued)

OTHER PUBLICATIONS

U.S. Official Action, dated Nov. 16, 2011, received in connection with related U.S. Appl. No. 13/046,857.

(Continued)

*Primary Examiner* — Yolanda L Wilson
(74) *Attorney, Agent, or Firm* — Meunier Carlin & Curfman, LLC

(57) ABSTRACT

A method, system, apparatus, and computer-readable medium are described for providing distributed hot-spare storage in a redundant storage cluster. According to one method, a portion of the unutilized space on the storage cluster is utilized as a distributed hot-spare storage node. Through this mechanism, a redundant storage cluster with N storage nodes may be contracted to a redundant array with N−1 nodes. Thin provisioning and intelligent data placement may also be utilized to implement the distributed hot-spare storage node. Through repeated application of such methods and systems, the failure of any storage node or the sequential failure of multiple storage nodes within a redundant storage cluster results in the recreation of the cluster as a redundant storage array with one fewer node, but with the same redundancy.

16 Claims, 13 Drawing Sheets

U.S. PATENT DOCUMENTS

| | | | |
|---|---|---|---|
| 6,105,122 | A | 8/2000 | Muller et al. |
| 6,108,748 | A | 8/2000 | Ofek et al. |
| 6,128,654 | A | 10/2000 | Runaldue et al. |
| 6,173,377 | B1 | 1/2001 | Yanai et al. |
| 6,282,619 | B1 | 8/2001 | Islam et al. |
| 6,289,398 | B1 | 9/2001 | Stallmo et al. |
| 6,502,166 | B1 | 12/2002 | Cassidy |
| 6,629,203 | B1 | 9/2003 | Humlicek |
| 6,671,705 | B1 | 12/2003 | Duprey et al. |
| 6,785,678 | B2 | 8/2004 | Price |
| 6,826,711 | B2 | 11/2004 | Moulton et al. |
| 7,069,385 | B2 | 6/2006 | Fujimoto et al. |
| 7,089,448 | B2 | 8/2006 | Hinshaw et al. |
| 7,155,466 | B2 | 12/2006 | Rodriguez et al. |
| 7,159,150 | B2 | 1/2007 | Kenchammana-Hosekote et al. |
| 7,231,493 | B2 | 6/2007 | Nguyen et al. |
| 7,315,958 | B1 | 1/2008 | Bridge, Jr. |
| 7,360,051 | B2 | 4/2008 | Sugino et al. |
| 7,366,837 | B2 | 4/2008 | Corbett et al. |
| 7,404,102 | B2 | 7/2008 | Soran et al. |
| 7,437,507 | B2 | 10/2008 | Sharma et al. |
| 7,457,980 | B2 | 11/2008 | Yang et al. |
| 7,664,793 | B1 | 2/2010 | Kekre et al. |
| 7,908,448 | B1 | 3/2011 | Chatterjee et al. |
| 7,996,608 | B1 | 8/2011 | Chatterjee et al. |
| 2002/0059540 | A1 | 5/2002 | Mann et al. |
| 2002/0083036 | A1 | 6/2002 | Price |
| 2002/0091746 | A1 | 7/2002 | Umberger et al. |
| 2003/0088803 | A1 | 5/2003 | Arnott et al. |
| 2003/0105923 | A1 | 6/2003 | Bak et al. |
| 2003/0158862 | A1 | 8/2003 | Eshel et al. |
| 2003/0221063 | A1 | 11/2003 | Eguchi et al. |
| 2004/0044865 | A1 | 3/2004 | Sicola et al. |
| 2004/0073831 | A1 | 4/2004 | Yanai et al. |
| 2004/0250031 | A1 | 12/2004 | Ji et al. |
| 2004/0255189 | A1* | 12/2004 | Chu et al. .................. 714/13 |
| 2005/0071389 | A1 | 3/2005 | Gupta |
| 2005/0091391 | A1 | 4/2005 | Burton et al. |
| 2005/0102551 | A1 | 5/2005 | Watanabe |
| 2005/0114350 | A1 | 5/2005 | Rose et al. |
| 2005/0273565 | A1 | 12/2005 | Hirakawa et al. |
| 2005/0273645 | A1 | 12/2005 | Satran et al. |
| 2006/0031649 | A1 | 2/2006 | Murotani et al. |
| 2006/0117212 | A1 | 6/2006 | Meyer et al. |
| 2006/0184731 | A1 | 8/2006 | Corbett et al. |
| 2006/0236064 | A1 | 10/2006 | Niles et al. |
| 2007/0011425 | A1 | 1/2007 | Sicola |
| 2007/0254922 | A1 | 11/2007 | Hiraiwa et al. |
| 2007/0271422 | A1 | 11/2007 | Osaki |
| 2007/0283348 | A1 | 12/2007 | White |
| 2008/0016301 | A1 | 1/2008 | Chen et al. |
| 2008/0046612 | A1 | 2/2008 | Beardsley et al. |
| 2008/0059734 | A1 | 3/2008 | Mizuno |
| 2008/0109601 | A1 | 5/2008 | Lemm et al. |
| 2009/0037679 | A1 | 2/2009 | Kaushik et al. |

OTHER PUBLICATIONS

U.S. Official Action, dated Dec. 6, 2011, received in connection with related U.S. Appl. No. 12/013,124.

U.S. Official Action, dated Jan. 10, 2012, received in connection with related U.S. Appl. No. 13/242,259.

U.S. Appl. No. 13/220,299, filed Aug. 29, 2011, entitled "Providing Redundancy in a Storage System," Inventors: Chatterjee et al.

U.S. Appl. No. 13/209,854, filed Aug. 15, 2011, entitled "Networked Raid in a Virtualized Cluster," Inventors: Chatterjee et a.

U.S. Official Action dated Sep. 29, 2011 in U.S. Appl. No. 13/209,854.

U.S. Appl. No. 13/204,070, filed Aug. 5, 2011, entitled "Background Movement of Data Between Nodes in a Storage Cluster," Inventors: Chatterjee et al.

U.S. Official Action dated Nov. 26, 2010 in U.S. Appl. No. 11/551,311.

U.S. Appl. No. 13/046,857, filed Mar. 14, 2011, entitled "Maintaining Data Consistency in Mirrored Cluster Storage Systems With Write-Back Cache," Inventors: Chatterjee et al.

U.S. Appl. No. 12/857,050, filed Aug. 16, 2010, entitled "Background Movement of Data Between Nodes in a Storage Cluster," Inventors: Chatterjee et al.

U.S. Notice of Allowance / Allowability dated Apr. 15, 2011 in U.S. Appl. No. 12/857,050.

U.S. Official Action dated Jan. 21, 2011 in U.S. Appl. No. 12/857,050.

U.S. Appl. No. 12/721,900, filed Mar. 11, 2010, entitled "Expanding the Storage Capacity of a Virtualized Data Storage System," Inventors: Chatterjee et al.

U.S. Notice of Allowance / Allowability dated Jan. 24, 2011 in U.S. Appl. No. 12/721,900.

U.S. Appl. No. 12/104,129, filed Apr. 16, 2008, entitled "Low Latency Synchronous Replication Using an N-Way Router," Inventors: Chatterjee et al.

U.S. Notice of Allowance / Allowability dated Sep. 28, 2011 in U.S. Appl. No. 12/104,129.

U.S. Official Action dated Mar. 22, 2011 in U.S. Appl. No. 12/104,129.

U.S. Appl. No. 12/013,124, filed Jan. 11, 2008, entitled "Two-Node High Availability Cluster Storage Solution Using an Intelligent Initiator to Avoid Split Brain Syndrome," Inventors: Chatterjee et al.

U.S. Official Action dated Mar. 7, 2011 in U.S. Appl. No. 12/013,124.

U.S. Appl. No. 12/013,116, filed Jan. 11, 2008, entitled "Maintaining Data Consistency in Mirrored Cluster Storage Systems With Write-Back Cache," Inventors: Chatterjee et al.

U.S. Official Action dated Jul. 8, 2010 in U.S. Appl. No. 12/013,116.

U.S. Appl. No. 12/013,110, filed Jan. 11, 2008, entitled "Maintaining Data Consistency in Mirrored Cluster Storage Systems Using Bitmap Write-Intent Logging," Inventors: Chatterjee et al.

U.S. Notice of Allowance / Allowability dated Apr. 12, 2011 in U.S. Appl. No. 12/013,110.

U.S. Official Action dated Nov. 22, 2010 in U.S. Appl. No. 12/013,110.

U.S. Official Action dated Jul. 9, 2010 in U.S. Appl. No. 12/013,110.

U.S. Appl. No. 11/695,854, filed Apr. 3, 2007, entitled "Asynchronous Data Replication," Inventors: Chatterjee et al.

U.S. Official Action dated Oct. 14, 2009 in U.S. Appl. No. 11/695,854.

U.S. Official Action dated Apr. 30, 2009 in U.S. Appl. No. 11/695,854.

U.S. Appl. No. 11/551,274, filed Oct. 20, 2006, entitled "Expanding the Storage Capacity of a Virtualized Data Storage System," Inventors: Chatterjee et al.

U.S. Notice of Allowance / Allowability dated Dec. 2, 2009 in U.S. Appl. No. 11/551,274.

U.S. Official Action dated May 13, 2009 in U.S. Appl. No. 11/551,274.

U.S. Official Action dated Dec. 29, 2008 in U.S. Appl. No. 11/551,274.

U.S. Appl. No. 11/551,291, filed Oct. 20, 2006, entitled "Providing Redundancy in a Storage System," Inventors: Chatterjee et al.

U.S. Notice of Allowance / Allowability dated Mar. 28, 2011 in U.S. Appl. No. 11/551,291.

U.S. Official Action dated Dec. 10, 2010 in U.S. Appl. No. 11/551,291.

U.S. Official Action dated Oct. 5, 2009 in U.S. Appl. No. 11/551,291.

U.S. Official Action dated Mar. 20, 2009 in U.S. Appl. No. 11/551,291.

U.S. Appl. No. 11/551,311, filed Oct. 20, 2006, entitled "Distributed Hot-Spare Storage in a Storage Cluster," Inventors: Chatterjee et al.

U.S. Notice of Allowance / Allowability dated Apr. 27, 2011 in U.S. Appl. No. 11/551,311.

U.S. Official Action dated Jul. 22, 2010 in U.S. Appl. No. 11/551,311.

U.S. Official Action dated Dec. 28, 2009 in U.S. Appl. No. 11/551,311.

U.S. Official Action dated Jul. 8, 2009 in U.S. Appl. No. 11/551,311.

U.S. Official Action dated Dec. 23, 2008 in U.S. Appl. No. 11/551,311.

U.S. Appl. No. 11/551,303, filed Oct. 20, 2006, entitled "Background Movement of Data Between Nodes in a Storage Cluster," Inventors: Chatterjee et al.

U.S. Notice of Allowance / Allowability dated Mar. 23, 2010 in U.S. Appl. No. 11/551,303.

U.S. Official Action dated Aug. 17, 2009 in U.S. Appl. No. 11/551,303.

U.S. Official Action dated Jul. 28, 2008 in U.S. Appl. No. 11/551,303.

U.S. Appl. No. 11/857,050, filed Aug. 16, 2010, entitled "Distributed Hot-Spare Storage in a Storage Cluster," Inventors: Chatterjee et al.

"PRO/10 Adapter: Reducing Bottlenecks for Maximum Performance," Intel, 2004, URL: http://www.intel.com/support/network/adapter/pro100/sb/cs-010531.htm.

* cited by examiner

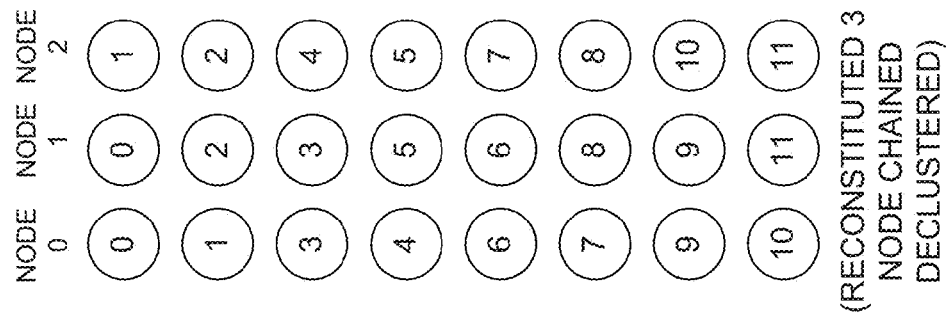
Fig. 5C (RECONSTITUTED 3 NODE CHAINED DECLUSTERED)
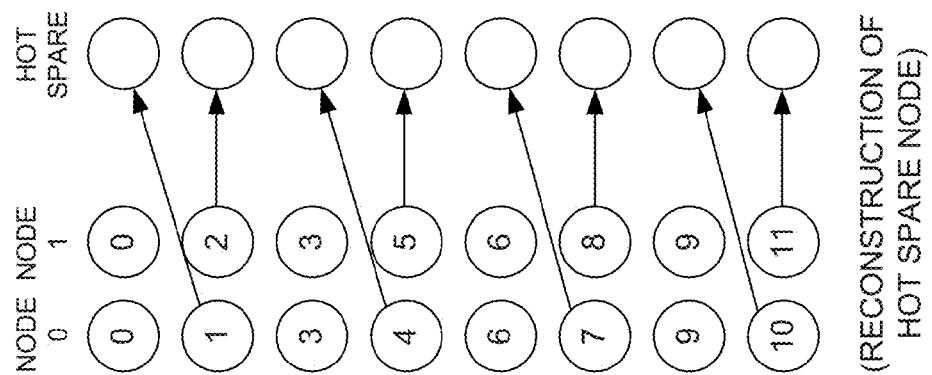
Fig. 5B (RECONSTRUCTION OF HOT SPARE NODE)
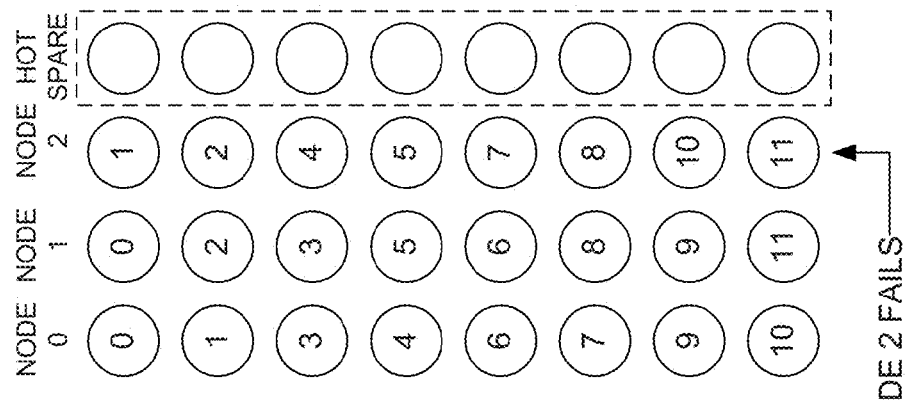
Fig. 5A
NODE 2 FAILS (RECONSTITUTED 3 NODE CHAINED DECLUSTERED)

(RECONSTRUCTION OF CLUSTER)

NODE 2 FAILS
DISTRIBUTED HOT SPARE ZONES

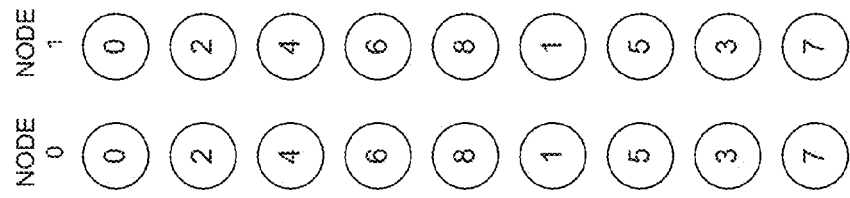
Fig. 7F (RECONSTITUTED 2 NODE CHAINED DECLUSTERED)
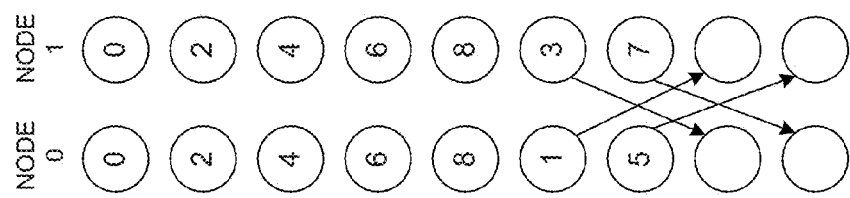
Fig. 7E RECONSTRUCTION OF THE CLUSTER
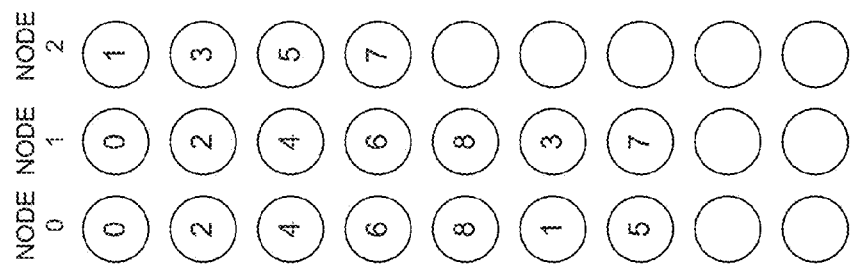
Fig. 7D NODE 2 FAILS

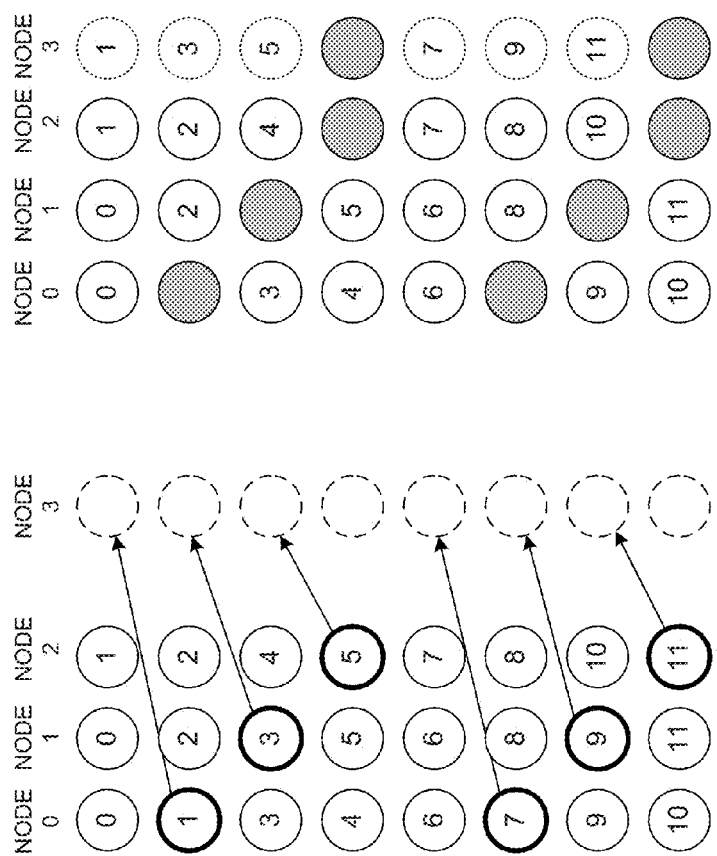
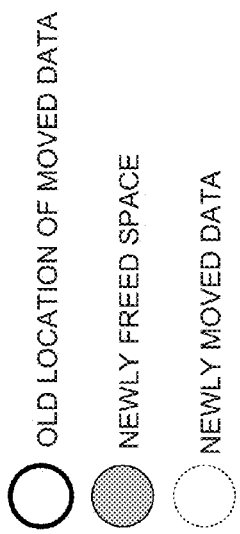
Fig. 8B
Fig. 8A

DISTRIBUTED HOT-SPARE STORAGE IN A STORAGE CLUSTER

CROSS-REFERENCE TO RELATED APPLICATIONS

This application is a continuation of U.S. patent application Ser. No. 11/551,311, filed Oct. 20, 2006, and entitled "Distributed Hot-Spare Storage in a Storage Cluster," the disclosure of which is incorporated herein by reference in its entirety. This application also claims the benefit of U.S. provisional patent application No. 60/728,453 filed on Oct. 20, 2005 and entitled "A Novel Method of Implementing a Distributed Hot-Spare Node in a Storage Cluster," U.S. provisional patent application No. 60/728,667, filed on Oct. 20, 2005 and entitled "A Novel Method of Background Movement of Data Between Nodes in a Storage Cluster," U.S. provisional patent application No. 60/728,680, filed on Oct. 20, 2005 and entitled "An Innovative Method of Expanding Storage Capacity in a Virtualized Storage System," and U.S. provisional patent application No. 60/728,666, filed on Oct. 20, 2005 and entitled "Method of Providing Redundancy in a Storage System Through Chained Declustering," each of which are expressly incorporated herein by reference in their entirety.

TECHNICAL FIELD

The disclosure provided herein relates generally to the field of storage systems consisting of multiple storage nodes and, more particularly, to the field of hot-spare storage nodes within a storage cluster.

BACKGROUND

Scalability is an important requirement in all data storage systems. Different types of storage systems provide diverse methods of seamless scalability through capacity expansion. In some storage systems, such as systems utilizing redundant array of inexpensive disk ("RAID") controllers, it is often possible to add disk drives (or other types of mass storage devices) to a storage system while the system is in operation. In such a system, the RAID controller re-stripes existing data onto the new disk and makes the capacity of the other disks available for new input/output ("I/O") operations. This methodology, known as "vertical capacity expansion," is common. However, this methodology has at least one drawback in that it only scales data storage capacity, without improving other performance factors such as the processing power, main memory, or bandwidth of the system.

In other data storage systems, it is possible to add capacity by "virtualization." In this type of system, multiple storage servers are utilized to field I/O operations independently, but are exposed to the initiator of the I/O operation as a single device, called a "storage cluster." Each storage server in a cluster is called a "storage node" or just a "node." When data storage capacity becomes low, a new server may be added as a new node in the data storage system. In addition to contributing increased storage capacity, the new storage node contributes other computing resources to the system, leading to true scalability. This methodology is known as "horizontal capacity expansion." Some storage systems support vertical expansion of individual nodes, as well as horizontal expansion by the addition of storage nodes.

Systems implementing horizontal capacity expansion may choose to concatenate the capacity that is contributed by each node. However, in order to achieve the maximum benefit of horizontal capacity expansion, it is necessary to stripe data across the nodes in much the same way as data is striped across disks in RAID arrays. While striping data across nodes, the data should be stored in a manner that ensures that different I/O operations are fielded by different nodes, thereby utilizing all of the nodes simultaneously. It is also desirable not to split I/O operations between multiple nodes, so that the I/O latency is low. Striping the data in this manner provides a boost to random I/O performance without decreasing sequential I/O performance. The stripe size is calculated with this consideration, and is called the "zone size."

When data is striped across multiple nodes, the process of re-striping data when a new node is added is lengthy and inefficient in most contemporary storage systems. In particular, current storage systems require the movement of a massive amount of data in order to add a new node. As an example, in order to expand a four node cluster to a five node cluster using current data migration methodologies, only one in twenty storage zones (referred to herein as "zones") remains on the same node, and even those zones are in a different position on the node. Hence, the current process of migration is effectively a process of reading the entire body of data in the system according to its unexpanded configuration, and then writing it in its entirety according to expanded configuration of the cluster.

Such a migration process typically takes several days. During this time, the performance of the cluster is drastically decreased due to the presence of these extra migration I/O operations. A complicated method of locking is also required to prevent data corruption during the data migration process. The storage capacity and processing resources of the newly added node also do not contribute to the cluster until the entire migration process has completed; if an administrator is expanding the node in order to mitigate an impending capacity crunch, there is a good likelihood that the existing capacity will be exceeded before the migration completes. In all cases, the migration process is cumbersome, disruptive and tedious.

In addition to scaling storage resources, a storage cluster can also be utilized to provide redundancy and protect against data loss due to the failure of a node. The administrator may configure the cluster so that each zone of data is stored on two or more nodes. In this way, if a single node fails, all of the data that is contained in it can be accessed from another box. One cluster arrangement that is commonly used for this purpose is called chained declustering. In a chained declustered storage system, zones are striped across all of the nodes, and they are also mirrored on at least two nodes.

In a cluster which is configured to provide redundancy, either through chained declustering or otherwise, a single node failure may occur without data loss, and the event of dropping the failed node and recovering its data from the other nodes can be handled in a manner that is transparent to the user. However, during the time that the failed node is down, the system is vulnerable to a second node failure. Two node failures will most likely cause data loss, even in a storage system that has redundancy. The only way to mitigate this possibility of data loss is to ensure that the failed node is repaired or rebuilt as soon as possible. Several attempts have been made to make this process automatic, so that administrator error does not expose the system to the possibility of data loss. One of the most common solutions is through the existence of a hot-spare storage node in the system. When a drive fails, and the data on it loses redundancy, the hot-spare is deployed by the system and the data that was present on the failed drive is rebuilt onto it. When the hot-spare rebuild has been completed, the system regains redundancy. When the failed node is replaced or repaired, it may either function as a new hot-spare, or the cluster may be transformed back to its original configuration, releasing the original hot-spare.

Some storage clusters utilize a dedicated hot-spare storage node. A dedicated hot spare is a separate storage node that is present on the storage cluster, and possibly powered on, ready to receive I/O requests. When any node in a cluster with a dedicated hot-spare fails, the other nodes immediately identify the hot-spare as the rejoining node and rebuild it. In this manner, the cluster is re-formed with redundancy, and a node failure can still be tolerated. However, unless another hot-spare is added, it is not possible to further re-form the cluster.

While the utilization of dedicated hot-spares is popular in the RAID field and in the virtualization space, this solution is a costly one. This is because the resources that are required for hot-spare storage nodes are unused until another node fails. However, in order to prevent availability from being compromised, they must be powered on and ready all the time, contributing to cost without contributing to performance.

It is with respect to these considerations and others that the following disclosure is presented.

SUMMARY

A method, system, apparatus, and computer-readable medium are described herein for providing distributed hot-spare storage in a storage cluster. According to one method, a portion of the unutilized space on the storage cluster is utilized as a distributed hot-spare storage node. Through this mechanism, a redundant storage cluster with N storage nodes may be contracted to a redundant array with N−1 nodes. Thin provisioning and intelligent data placement may also be utilized to implement the distributed hot-spare storage node. Through such methods and systems, the failure of any storage node within a redundant storage cluster results in the recreation of the cluster as a redundant storage array with one fewer node, but with the same redundancy.

According to one method provided herein, a distributed hot-spare storage node is provided in a redundant storage cluster that utilizes thin provisioning to allocate storage capacity. The distributed hot-spare storage node is formed from a portion of the unutilized space on the nodes of the storage cluster. When the failure of one of the nodes of the storage cluster is detected, the storage cluster is reformed as a lower-order storage cluster utilizing the distributed hot-spare storage node. In this manner, single-node failures in redundant clusters of storage nodes may be handled in a manner designed to maintain the availability of the cluster and to restore redundancy as quickly as possible.

According to other aspects described herein, data is stored on the storage cluster so that all data is mirrored on two nodes. When a storage cluster having N storage nodes fails, the data that was mirrored on the failed storage node is copied from the remaining N−1 storage nodes to the distributed hot-spare storage node. In this manner, the redundant nature of the storage cluster is restored without the need to maintain a dedicated hot-spare storage computer. The process of converting a redundant cluster with N nodes to a redundant cluster with N−1 nodes is called a contraction of the cluster. The reverse process is called expansion of the cluster.

According to other aspects, an intelligent data placement algorithm, such as the data placement algorithm ("DPA"), may be utilized to store data on the cluster in a manner designed to reduce the amount of data that must be copied during expansion or contraction operations. When utilized in conjunction with such an algorithm, the amount of data that must be moved from each of the storage nodes to the distributed hot-spare storage node is approximately equal. This minimizes data movement and increases performance during the contraction operation.

According to other aspects presented herein, an exception table may be generated that includes data identifying the areas of data that need to be copied to the distributed hot-spare storage node to reconstitute the storage cluster. A background thread is executed to migrate data from the storage nodes to the distributed hot-spare storage node according to the contents of the exception table.

According to other aspects presented herein, the contraction process may be repeated many times if required, provided there is sufficient space available for the operation to succeed. In this manner, it is possible to preserve redundancy of the cluster even when multiple nodes in the cluster fail sequentially.

The above-described aspects, and other aspects described herein, may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the embodiments presented herein, will be apparent from a reading of the following detailed description and a review of the associated drawings.

BRIEF DESCRIPTION OF THE DRAWINGS

FIGS. 5A-5C are storage diagrams illustrating the use of a dedicated hot-spare storage node in a storage cluster;

FIGS. 7A-7F are storage diagrams illustrating the contraction storage node that utilizes a distributed hot-spare storage node and that also utilizes thin provisioning to allocate unused storage space on the storage nodes;

FIGS. 8A-8C are storage diagrams illustrating the expansion and contraction of a storage node that utilizes a mirrored data placement algorithm to arrange the storage of data;

DETAILED DESCRIPTION

Figure 1:
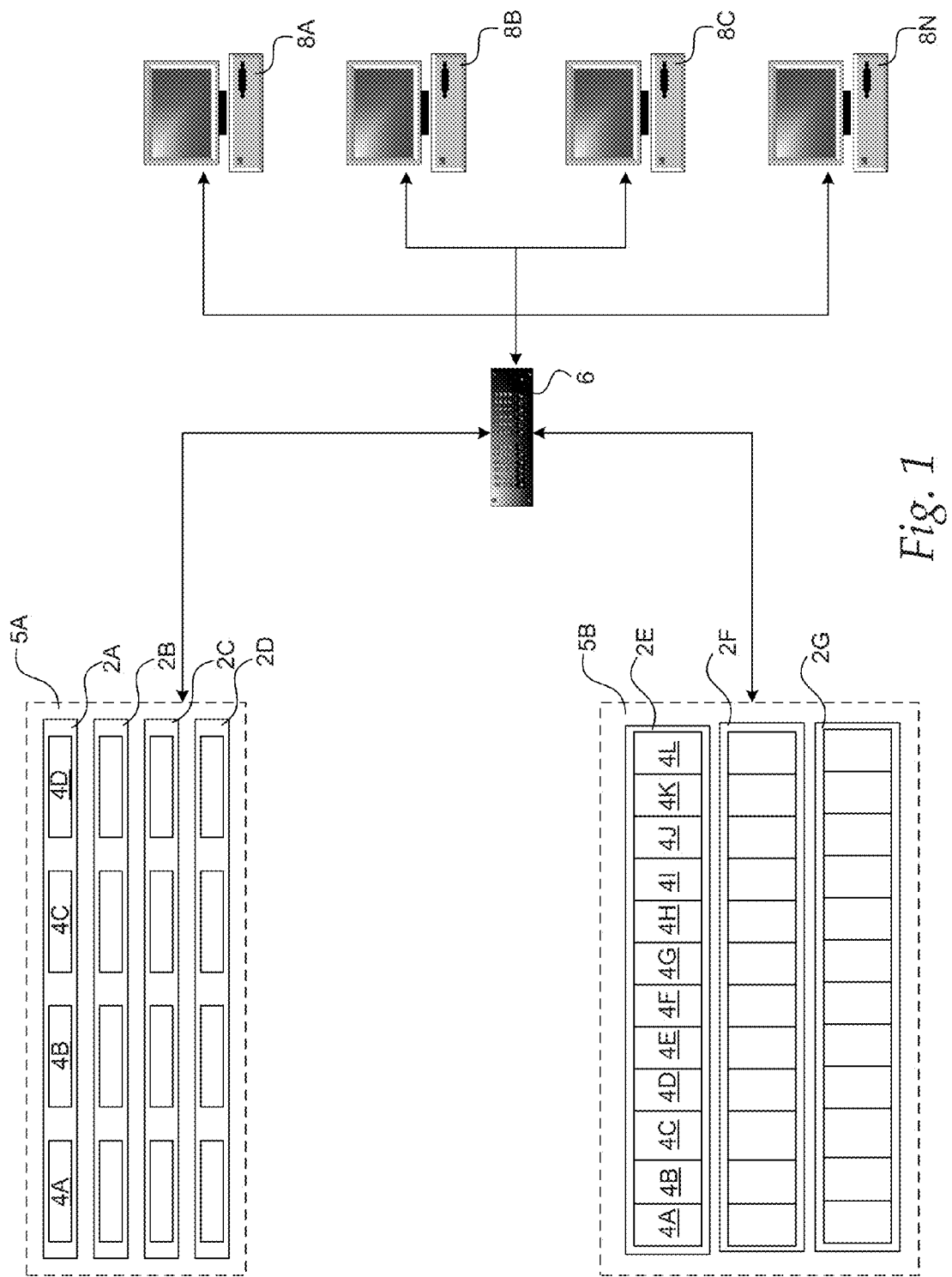
FIG. 1 is a computer architecture and network diagram showing aspects of a computer network and a storage server computer that provides an operating environment for embodiments of the disclosure presented herein.

In the following detailed description, references are made to the accompanying drawings that form a part hereof, and in which are shown by way of illustration specific embodiments or examples. Referring now to the drawings, in which like numerals represent like elements through the several figures, aspects of an illustrative operating environment will be described.

Figure 2:
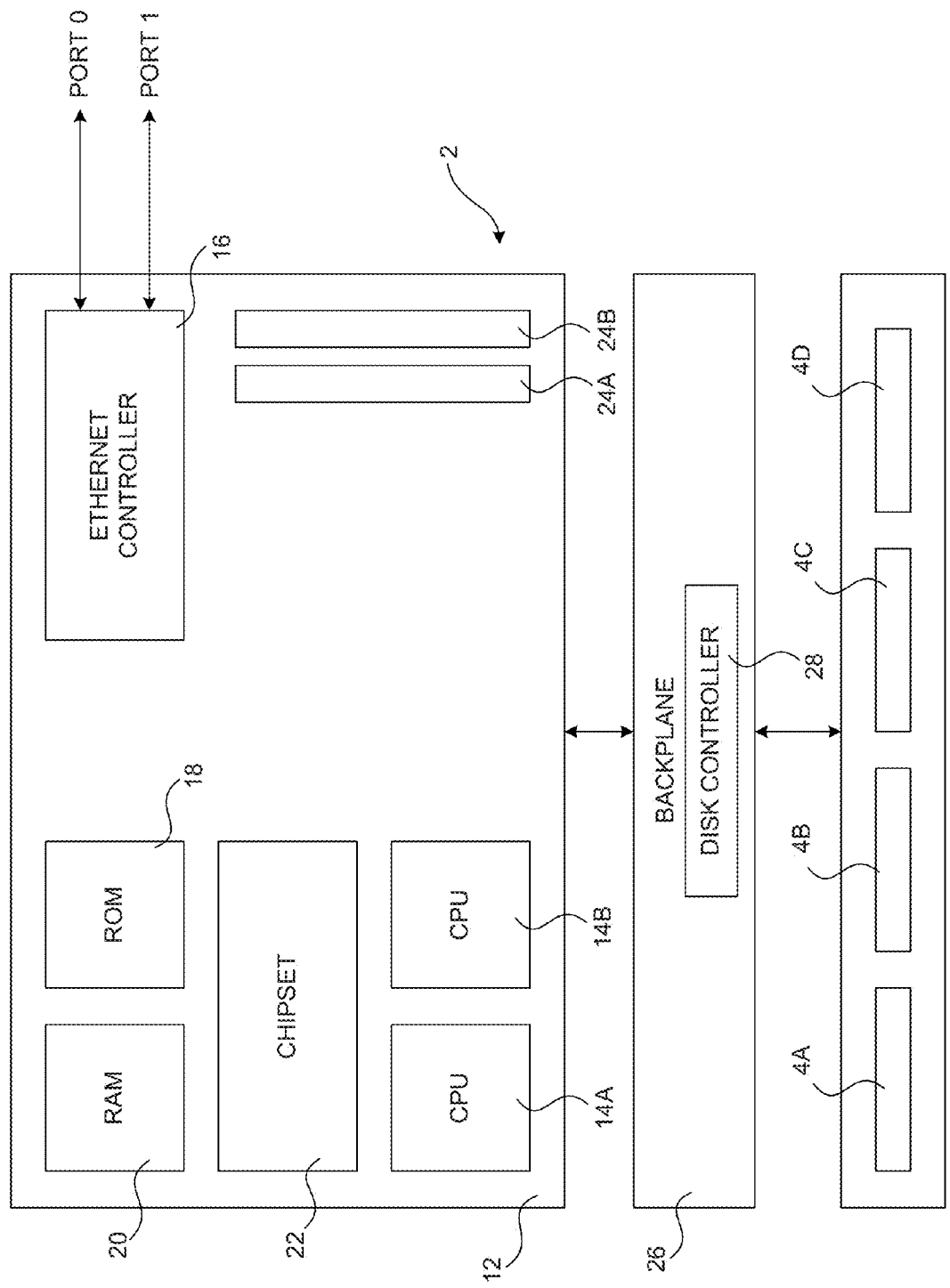
FIG. 2 is a computer architecture diagram illustrating aspects of the hardware of an illustrative storage server computer described herein.
Figure 3:
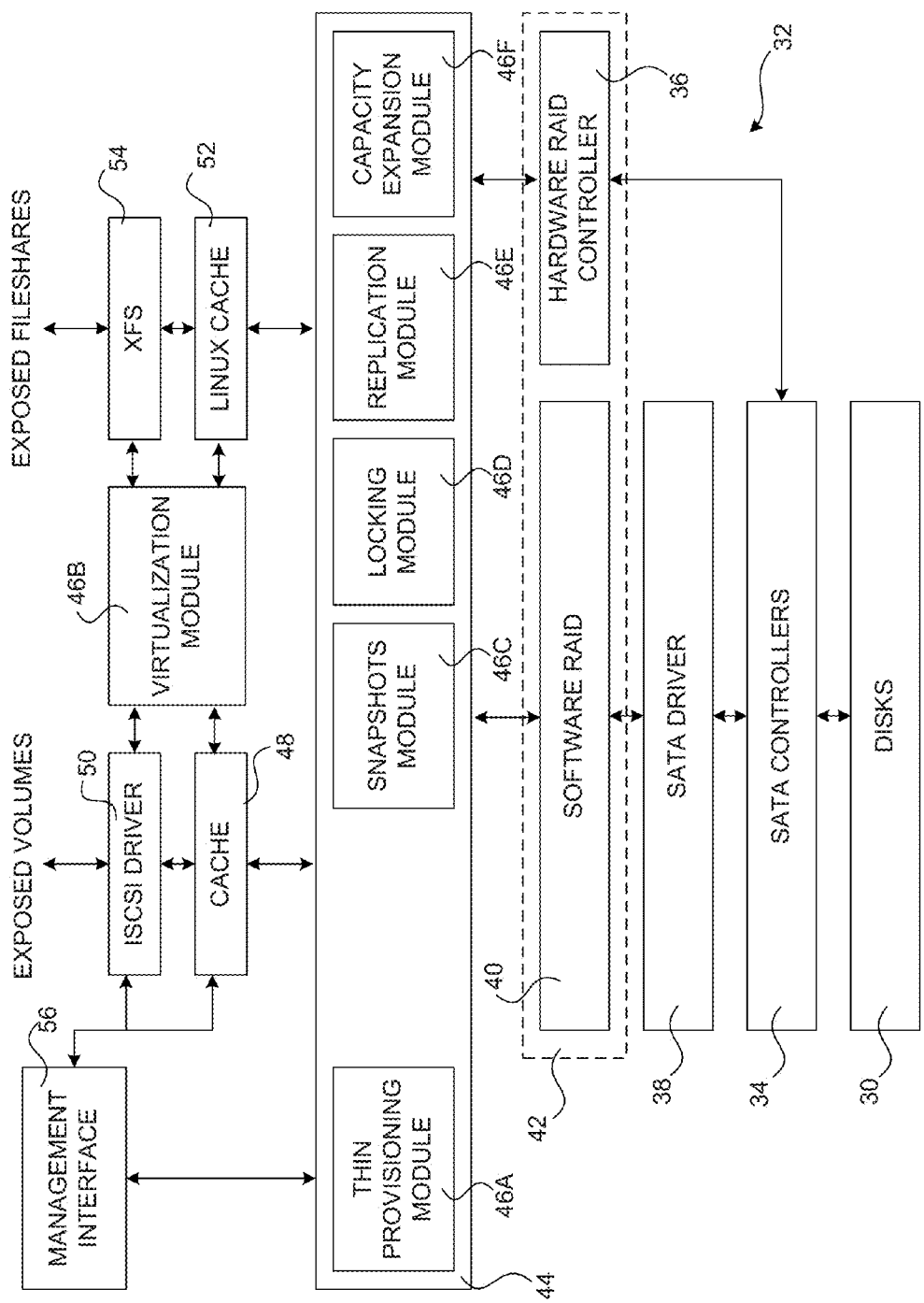
FIG. 3 is a software architecture diagram illustrating various aspects of a storage stack utilized by a storage server described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Referring now to FIG. 1, an illustrative operating environment for the various implementations described herein will be disclosed. As shown in FIG. 1, the embodiments presented herein may be implemented in the storage server computers 2A-2G (also referred to herein as "storage nodes" or a "node") that are operative to read and write data to one or more mass storage devices, such as hard disk drives. According to implementations, the storage server computers 2A-2G may be housed in a one rack space unit storing up to four hard disk drives. For instance, the node 2A includes the hard disk drives 4A-4D. Alternatively, each node may be housed in a three rack space unit storing up to fifteen hard disk drives. For instance, the node 2E includes the hard disk drives 4A-4L. Other types of enclosures may also be utilized that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to an initiator of an I/O operation as a single device. It should be appreciated that a storage cluster may include any number of storage nodes.

When data storage capacity becomes low on a storage cluster, additional capacity may be added to the cluster through the addition of a new storage node to the cluster or by adding additional mass storage devices to an existing storage node in the cluster. As discussed briefly above, the addition of a new storage node to a cluster not only increases the storage capacity of the cluster, but also contributes other computing resources to the system, leading to true scalability. This methodology is known as "horizontal capacity expansion." The implementations described herein are primarily concerned with the addition of storage capacity to a storage cluster through the addition of a new storage node.

In order to achieve the maximum benefit of horizontal capacity expansion, data is striped across the nodes of each storage cluster. For instance, the cluster 5A may stripe data across the storage nodes 2A, 2B, 2C, and 2D. The cluster 5B may stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance. In particular, striping is most commonly done by dividing the storage capacity of each node into storage "zones," and by placing all zones with the same remainder when divided by the number of nodes, into the same node. For example, in a four node cluster such as the cluster 5A, zones 0, 4, 8, 12, 16, etc. are stored in node 0; zones 1, 5, 9, 13, 17 etc. are stored in node 1; zones 2, 6, 10, 14, 18 etc. are stored in node 2; and zones 3, 7, 11, 15, 19 etc. are stored in node 3.

According to embodiments, each storage server computer 2A-2G includes one or more network ports operatively connected to a network switch 6 using appropriate network cabling. It should be appreciated that, according to one implementation disclosed herein, Ethernet or Gigabit Ethernet is utilized. However, it should also be appreciated that other types of suitable physical network connections may be utilized to form a network of which each storage server computer 2A-2G is a part.

The network switch 6 is connected to one or more client computers 8A-8N (also referred to herein as "initiators"). It should be appreciated that other types of networking topologies may be utilized to interconnect the clients and the storage server. It should also be appreciated that the initiators 8A-8N may be connected to the same local area network ("LAN") as the clusters 5A-5B or may be connected to the clusters 5A-5B via a distributed wide area network ("WAN"), such as the Internet. An appropriate protocol, such as the iSCSI protocol may be utilized to enable the initiators 8A-8D to communicate with and utilize the various functions of the storage clusters 5A-5B over a wide area network such as the Internet.

Turning now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments presented herein will now be described. In particular, FIG. 3 illustrates a storage stack 32 utilized in the embodiments described herein. At the top of the storage stack 32, storage volumes or fileshares are exposed to the initiators 8A-8N. At the bottom of the storage stack 32 are the actual mass storage devices, such as the disks 4A-4D, that are utilized to store the data. The mass storage devices are, in turn, connected to a disk controller, such as a Serial ATA ("SATA") controller 34 or a hardware RAID controller 36. In the case of a SATA controller, a SATA driver 38 may be utilized to access the hardware device. Additionally, a software RAID module 42 may also be utilized to provide RAID services in the absence of a hardware RAID controller 36. A unified RAID management layer 42 may be utilized to simplify the utilization of RAID with either software or hardware implementations.

Above the unified RAID management layer 42 sits a kernel module 44 that implements the functionality described herein. In particular, the kernel module 44 may provide functionality for implementing thin provisioning, snapshots, locking, replication, and capacity expansion. These features are implemented by the various modules illustrated in FIG. 3, some of which are described in greater detail herein. In particular, the thin provisioning module 46A provides functionality for allocating physical capacity to logical volumes on an as-needed basis and for provision tracking The snapshots module 46C provides functionality for creating, utilizing, and managing point in time snapshots of the contents of logical storage volumes. The replication module 46E provides functionality for replication within the computer 2. The locking module 46D provides functionality for synchronizing input/output operations in a computer system that utilizes snapshots and thin provisioning. The capacity expansion module 46F is a related component to the virtualization module, and provides functionality for re-striping data across multiple nodes when a new node is added. A chained declustering module (not shown in FIG. 3) may also operate within the kernel module 44 for providing support for chained declustering and for providing the functionality described herein for resynchronizing storage nodes.

Above the kernel module 44, a number of software components are utilized depending upon the access mechanism utilized to access the storage cluster of which the storage server computer 2 is a part. In particular, a Storage Area Network ("SAN") path is provided that utilizes a cache 48 and an iSCSI driver 50. A Network Attached Storage ("NAS") path is also provided that utilizes a LINUX cache 52 and the XFS high-performance journaling file system 54. Volumes are exposed through the SAN path while fileshares are exposed through the NAS path. The virtualization module 46B provides functionality for clustering, for governing the manner of zoning data among various nodes, and for specifying how each I/O operation is routed to the several nodes. Aspects of the virtualization module 46B are described in greater detail herein.

It should be appreciated that the kernel module 44 comprises a LINUX-compatible mass storage device driver in one embodiment. However, although the embodiments presented herein are described as being implemented within a LINUX-compatible device driver, the various aspects presented herein may be implemented at different points within the storage stack and in conjunction with other operating systems. For instance, the aspects presented herein may be implemented with the FREEBSD operating system or with the WINDOWS family of operating systems from MICROSOFT CORPORATION of Redmond, Wash. According to embodiments, a management interface 56 may also be provided for controlling and monitoring the functionality presented herein. The management interface communicates with the various layers through software interfaces to retrieve performance data, provide configuration data, and to perform other functions.

Figure 4A:
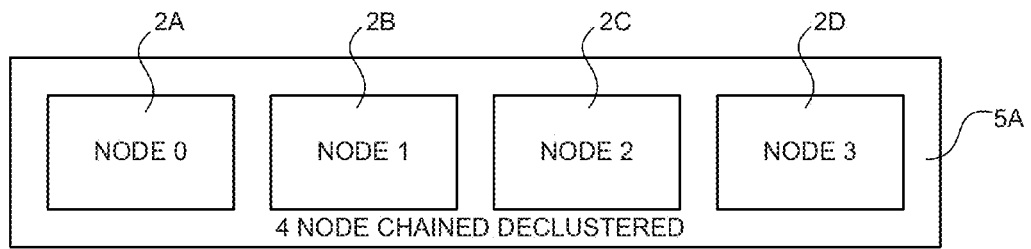
FIGS. 4A-4E are block diagrams illustrating the contraction of a storage cluster following the failure of a storage node.
Figure 4B:
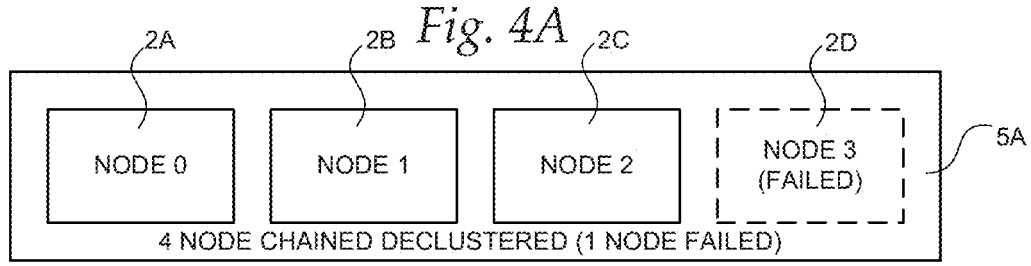

FIG. 4A shows a typical virtualized storage cluster 5A containing several nodes 2A-2D. Due to hardware problems, or due to normal wear and tear, any of the nodes in the cluster 5A may fail. For instance, as shown in FIG. 4B, the node 2D has failed. In order to preserve data availability in the event of such an occurrence, the cluster 5A is configured as a chained declustered system, in which every zone of data in the system is mirrored on two different nodes (a zone being the unit of virtualization). In a chained declustered system, even if one node fails, the other nodes mirror the data on this node, and can take over.

A second node failure on a degraded four node chained declustered system will lead to the failure of the volume, since now there is the possibility that both the mirror nodes of a particular zone of data have failed. The system administrator responsible for the cluster is expected to repair the fourth node before it can fail, but it may be impossible for him or her to physically perform the repair immediately. In this case, the best solution for the cluster 5A would be for it to reconfigure itself into a three node cluster by contracting, given, of course, that there is sufficient free space in the remaining three nodes to do so. Hence, the four-node degraded cluster becomes a three-node optimal cluster with less free space. This is illustrated in FIG. 4C, wherein the cluster 5A has reconfigured itself as a three node chained declustered storage cluster following the failure of the node 2D.

Figure 4C:
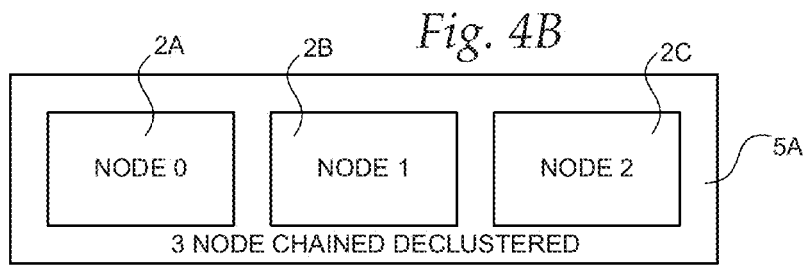
Figure 4D:
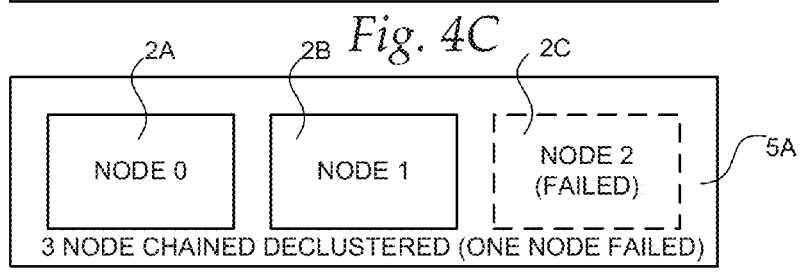
Figure 4E:
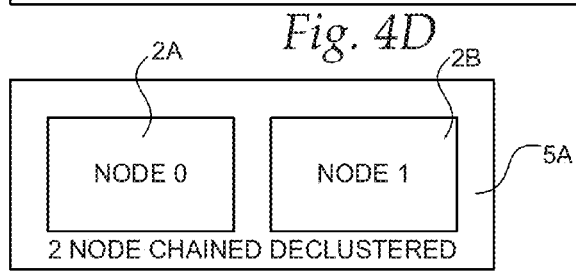

The reconfigured three node cluster 5A shown in FIG. 4C may tolerate a single node failure without compromising on availability. Such a failure will lead to the cluster 5A becoming a three-node degraded cluster. This is shown in FIG. 4D. The cluster 5A shown in FIG. 4D may again reconfigure itself by contraction, this time as an optimal 2-node cluster. Such a cluster 5A is shown in FIG. 4E. This two node cluster 5A is still tolerant to one-node failure. A degraded two node cluster, however, cannot be contracted any further and still remain chained declustered.

At any point of time, the cluster 5A illustrated in FIGS. 4A-4E can be expanded by the addition of new nodes. For example, a two node cluster may be expanded to a three node cluster by the addition of a new node and the restriping of the data on the cluster. This expansion process is described in U.S. provisional patent application No. 60/728,680, filed on Oct. 20, 2005 and entitled "An Innovative Method of Expanding Storage Capacity in a Virtualized Storage System," which is expressly incorporated by reference herein in its entirety. Similarly, the subsequent three node cluster 5A shown in FIG. 4C may expand back into the original four node cluster 5A shown in FIG. 4A. This process can be continued indefinitely without a limit on the number of nodes supported.

FIGS. 5A-5C illustrate how a dedicated hot-spare may be utilized to retain redundancy after node failure. A dedicated hot spare is a separate storage node that is present on the storage cluster, and possibly powered on, ready to receive I/O requests. FIG. 5A illustrates a storage cluster having three nodes and a hot-spare. When any node in a cluster with a hot-spare fails, the other nodes immediately identify the hot-spare as the rejoining node and rebuild it. This is illustrated in FIG. 5B. In this FIGURE, node 2 has failed and the contents of the first two nodes are being rebuilt on the hot-spare. No data is lost due to the single node failure because of the chained declustered nature of the cluster shown in FIGS. 5A-5B. In this manner, the three-node cluster is re-formed with redundancy, and a node failure can still be tolerated. This is shown in FIG. 5C. However, unless another hot-spare is added to the configuration shown in FIG. 5C, it is not possible to further re-form the cluster.

While the utilization of dedicated hot-spares is popular in the RAID field and in the virtualization space, this solution is a costly one. This is because the resources that are required for hot-spare storage nodes are unused until another node fails. However, in order to prevent availability from being compromised, they must be powered on and ready all the time, contributing to cost without contributing to performance.

Figure 6C:
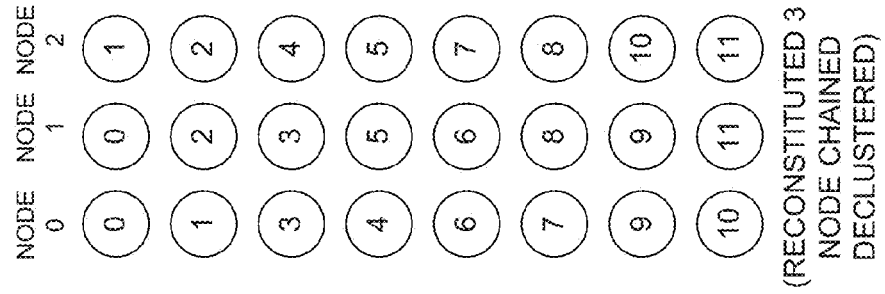
FIGS. 6A-6C are storage diagrams illustrating the contraction of a storage node that utilizes a distributed hot-spare storage node in response to the failure of a storage node.
Figure 6B:
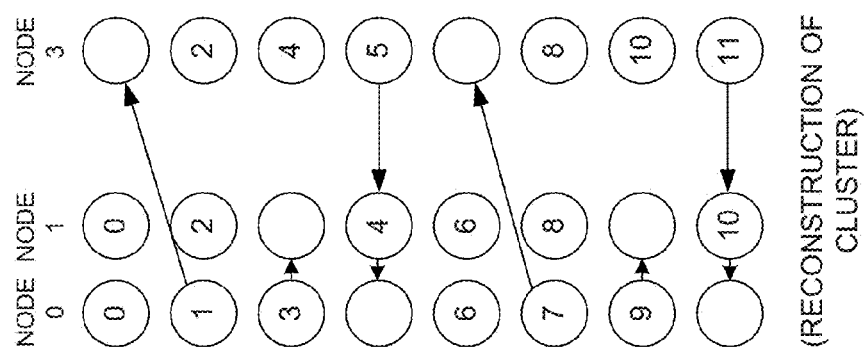
Figure 6A:
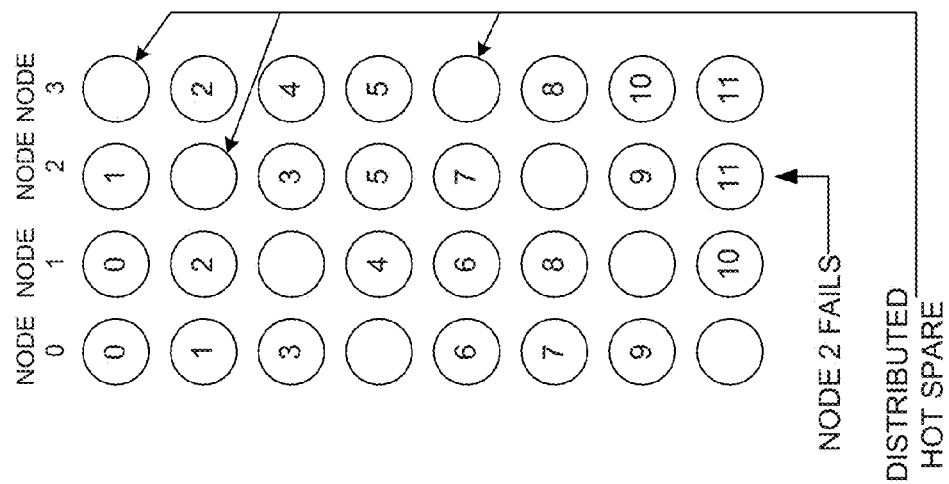

As an alternative to a dedicated hot-spare storage node, aspects of the disclosure herein present a distributed hot-spare storage node. In this solution, a hot-spare is not present as an explicitly new node, but is rather present as unutilized space on all nodes which may be used for restriping in the event that a storage node fails. In this manner, the distributed hot-spare storage node is maintained as a portion of the unused storage space on the storage nodes of the storage cluster. This solution is illustrated in FIGS. 6A-6C. In particular, FIG. 6A shows a four node storage cluster utilizing a distributed hot spare. In this example, node 2 of the storage cluster shown in FIG. 6A fails. In response thereto, the storage cluster is rebuilt as a three node cluster utilizing the free space distributed among the remaining nodes. The operations necessary to rebuild the degraded four node cluster into a distributed three node cluster are shown in FIG. 6B. The result of these operations are illustrated in the form of the reconstituted chained declustered three node cluster shown in FIG. 6C.

Another level of flexibility in maintaining a distributed hot spare is provided through the use of a storage stack that implements thin provisioning. The advantage of a thin-provisioned system is that there is no pre-defined correlation between logical space, as exposed by a volume, and the actual physical space present on the storage media. This makes the process of allocating and freeing space in the storage cluster extremely easy and convenient. Such a thin provisioned storage system is described in U.S. patent application Ser. No. 11/254,347, filed on Oct. 20, 2005, and entitled "Method, System, Apparatus, and Computer-Readable Medium for Provisioning Space in a Data Storage System," which is expressly incorporated herein by reference in its entirety.

Figure 7C:
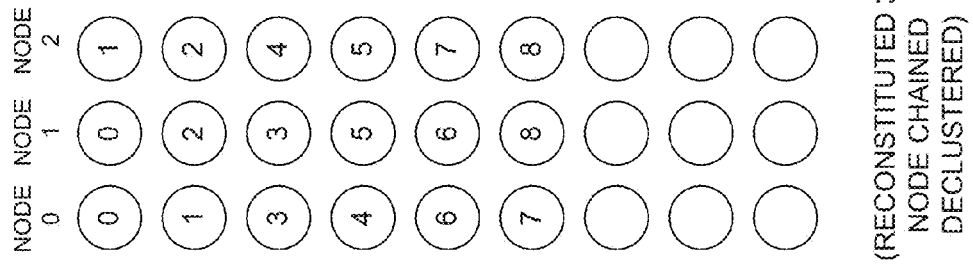
Figure 7B:
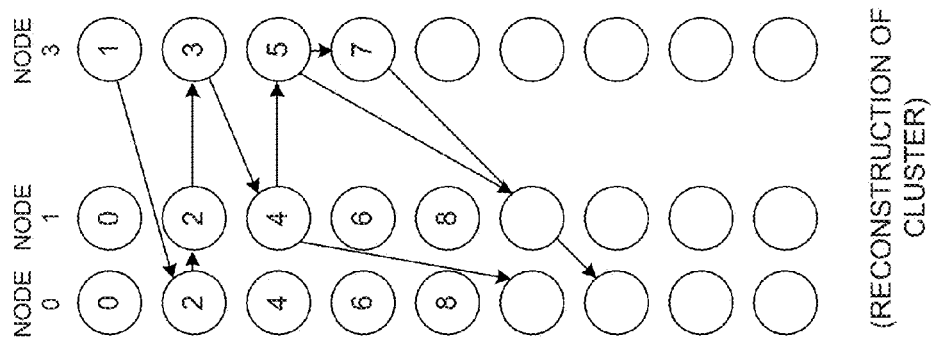
Figure 7A:
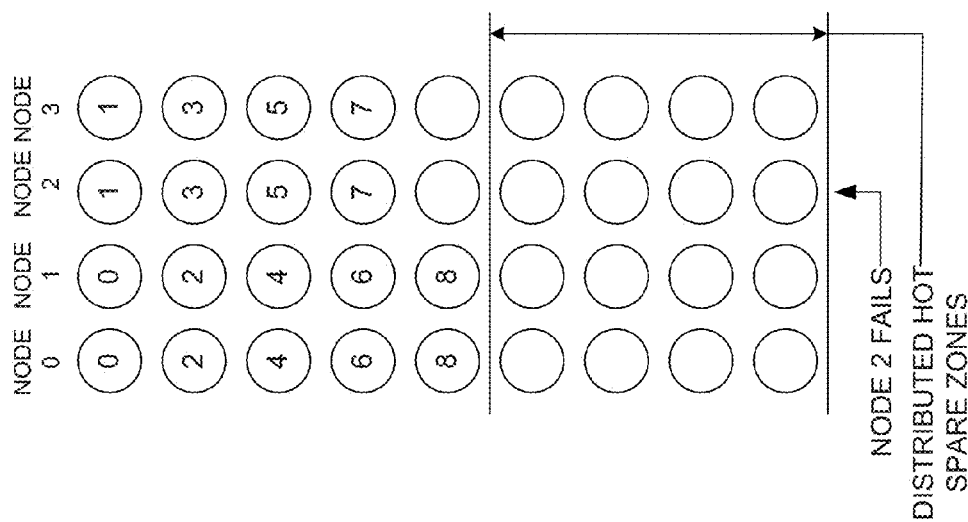

FIGS. 7A-7F show how a thin-provisioned chained declustered system may be infinitely contracted. In particular, in one example illustrated in FIG. 7A, a four node clustered thin-provisioned storage cluster experiences a node failure. Fortunately, there is a substantial amount of free space on the storage cluster. As a result, the free space on the storage cluster is allocated to reconstruct the zones lost in the failed node from their mirrors. This is shown in FIG. 7B. After the zones lost in the failed node are reconstructed, the cluster now becomes the three node chained declustered volume shown in FIG. 7C.

Because there is still a quantity of free space available in the storage cluster as configured in FIG. 7C, the free space may be used to reconstitute the system once more in the event of another node failure. For instance, in FIG. 7D, another node in the storage cluster fails. In response thereto, the cluster is reconstructed in the manner shown in FIG. 7E thereby resulting in the two node chained declustered storage node shown in FIG. 7F. It should be appreciated that the cluster may be expanded back to its original state through the addition of another node to the cluster and the reconstruction of the nodes in the reverse manner as shown in FIGS. 7A-7F.

One perceived disadvantage of the combination of thin provisioning and chained declustering to provide distributed hot-spare storages, is that there are a substantial number of data moves to be made in order to re-stripe the cluster to take the form of the chained declustered system with a lower order. This is per se not a serious issue, since the amount of time taken for such a re-striping will not exceed a few days at worst. Storage systems are designed to provide years of reliable service; the probability of two nodes failing within a day or two of each other is slim.

However, even the process of contraction into a distributed hot spare by restriping may be made easier by leveraging on the benefits of a minimal expansion placement algorithm such as the Data Placement Algorithm ("DPA") or mirrored DPA ("m-DPA"). In such systems, the excess data moved to newly joining nodes is guaranteed to be minimal and balanced, i.e., it is guaranteed that an approximately equal amount of data will move from each old node to a new node which is joining afresh, without any inter-node data movement between the old nodes. Such systems are described in U.S. provisional patent application No. 60/728,680, filed on Oct. 20, 2005 and entitled "An Innovative Method of Expanding Storage Capacity in a Virtualized Storage System," and U.S. provisional patent application No. 60/728,666, filed on Oct. 20, 2005 and entitled "Method of Providing Redundancy in a Storage System Through Chained Declustering," each of which are expressly incorporated herein by reference in their entirety.

The expansion of a storage cluster through the use of the DPA is shown in FIGS. 8A-8B. In particular, FIG. 8A illustrates a three node chained declustered storage node that is being expanded through the addition of a fourth node. Through the use of the DPA algorithm, an equal amount of data is copied from the three nodes present prior to expansion, and no data is copied between three nodes present prior to expansion. The expanded four node chained declustered storage node is shown in FIG. 8B.

Figure 8C:
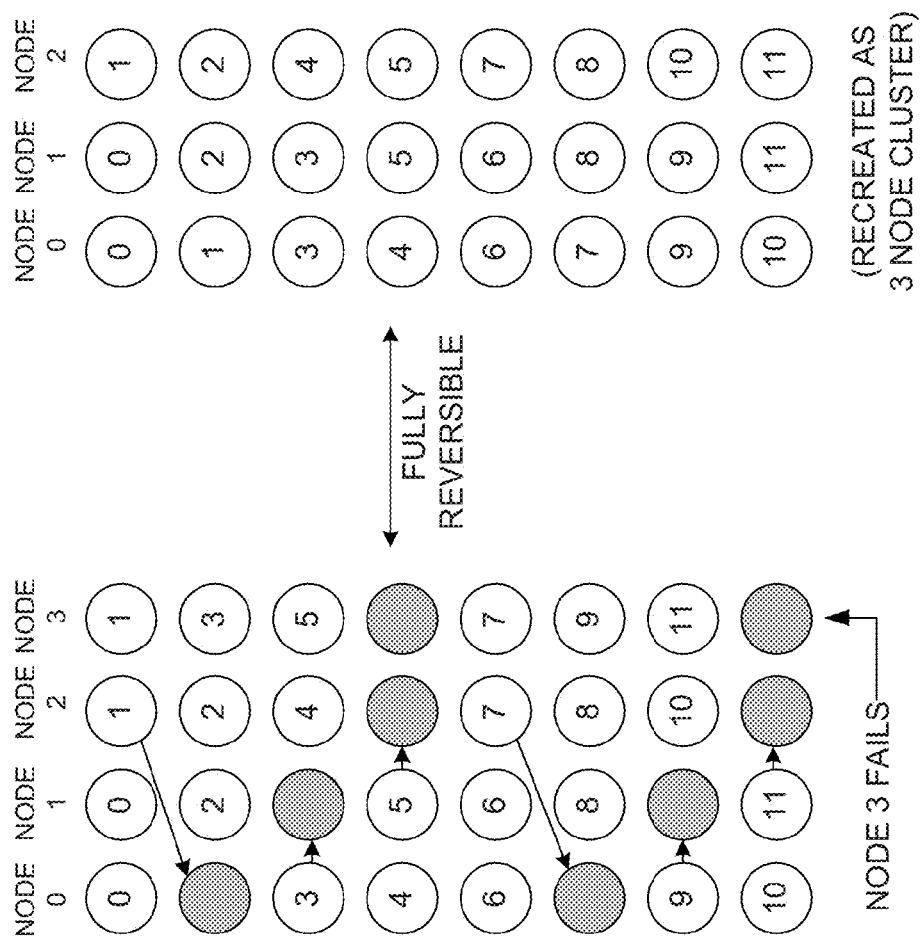

According to aspects of the disclosure presented herein, the expansion logic of the DPA and the m-DPA may also be utilized to contract a storage cluster in the event of the failure of a node. In particular, FIG. 8C shows how the failure of the last node in the cluster results in a reverse migration that reforms the cluster to an arrangement that is identical to that shown in FIG. 8A as the unexpanded cluster. The fully-reversible nature of this transfer means that all the benefits of DPA, such as reduced migration time; reduced migration traffic; improved performance during migration; maximum benefit to most used data; immediate availability of additional resources; and avoiding transitory out-of-space conditions.

In one implementation, a mechanism of contraction based on an exception table (also referred to herein as a "tab") is provided. Tabbing is discussed in detail in U.S. provisional patent application No. 60/728,667, filed on Oct. 20, 2005 and entitled "A Novel Method of Background Movement of Data Between Nodes in a Storage Cluster," which is expressly incorporated herein by reference in its entirety. In this method of resynchronization, a "positive" tab and a "negative" tab are generated. A positive tab refers to an area on storage node that needs to be migrated to another node. A negative tab refers to an area on a storage node that needs to be migrated from another node. Data is migrated from the positive tab to the negative tab. This is illustrated in FIG. 9.

Figure 9:
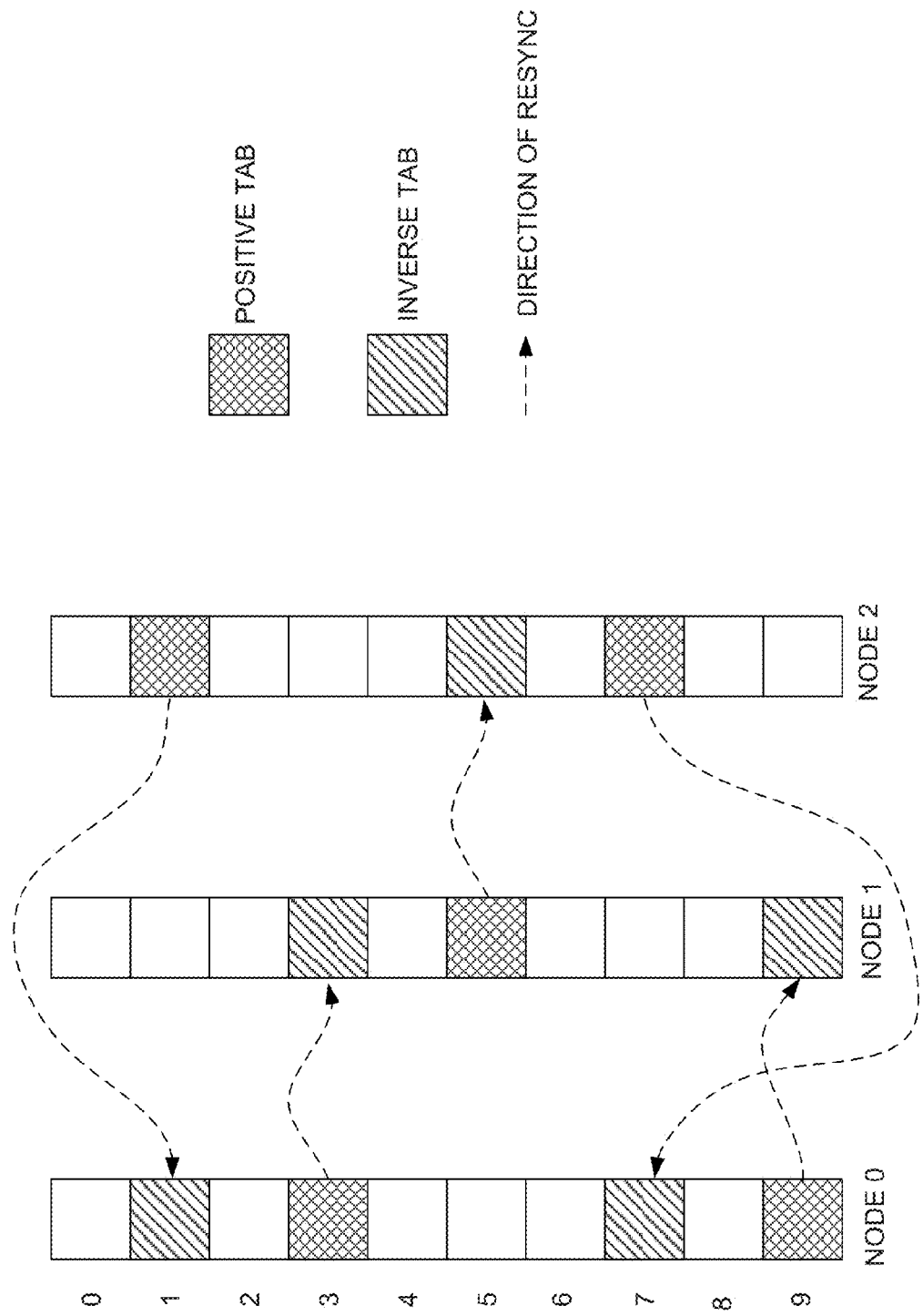
FIG. 9 is a storage diagram that illustrates the utilization of an exception table to coordinate the movement of data between storage nodes during a contraction operation.

As shown in FIG. 9, source zones are tabbed positively, whereas the free space that they move into are tabbed negatively. Data is moved between the two by one or more resynchronization threads executing on the storage cluster. The resynchronization threads may be executed in the background. A failed node does not, of course, participate in the rebuild.

FIG. 9 also shows that the same node may be the source as well as the destination for resynchronization for different chunks. For example, in node 0, chunks 3 and 9 are current and node 1 is the resynchronization destination. Chunks 1 and 7 of the node 0, however, are out-of-date and node 2 is the source. This situation may arise in several scenarios, including capacity contraction and defragmentation/compaction operations. Since the differentiation of tabs is made at the level of a chunk in one implementation, i.e. each chunk is identified as a positive or inverse tab instead of the entire node being a uniform tab type, then the process of resynchronization is identical regardless of which nodes are the sources of resynchronization and which are the destinations. The direction of resynchronization is always in the direction of positive tab to inverse tab. After a chunk has been migrated, its tab bits are reset, regardless of whether it is a positive or inverse tab. Once the resynchronization of all chunks has completed, the cluster may operate in a normal fashion. It should be appreciated that the tabbing process shown in FIG. 9 and described above may be utilized in an implementation of the distributed hot-spare functionality described herein.

Figure 10:
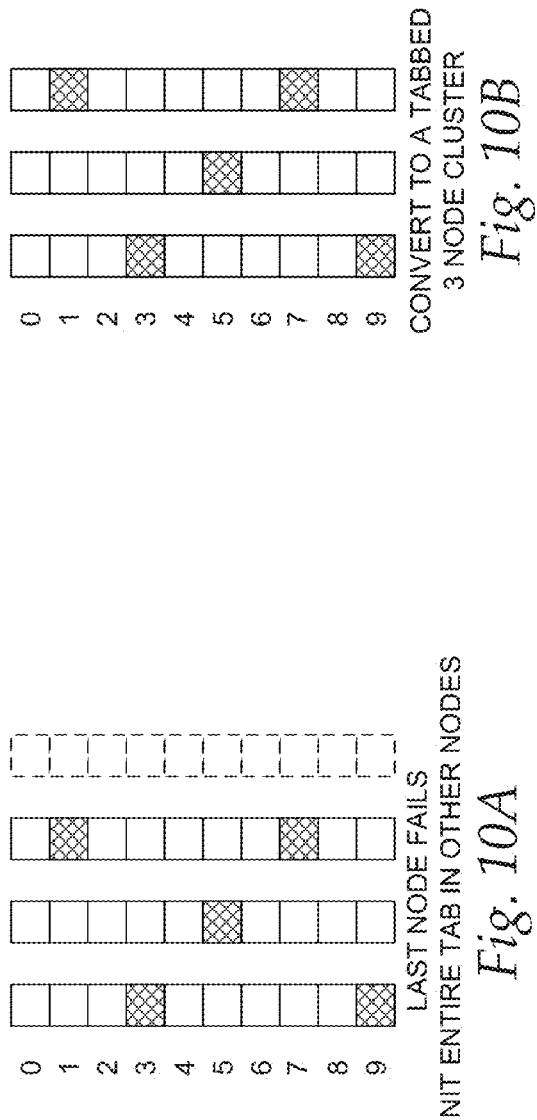
FIGS. 10A-10D are storage diagrams that illustrate the process of organizing the contents of the exception table for a storage cluster prior to the execution of a synchronization thread for contracting the storage node.

FIGS. 10A-10D shows the sequence of steps required to bring a storage cluster to the point where a resynchronization thread may take over and begin copying data between the nodes in the background. In particular, FIG. 10A shows a four node chained declustered storage system in which the last node has failed. After the last node fails, the other nodes have their tabs initialized. The internal zonemaps of the remaining zones may also be changed so that they are configured as a three node cluster operating in tabbing mode. This is shown in FIG. 10B.

As a result of operating in tabbing mode, all tabbed I/O operations are fielded locally. Next, the negative tab is generated for the tab of each pair of boxes that share a mirror based on the new map, and this negative tab is communicated to the destination box in question. This is illustrated in FIG. 10C. Once the tab has been prepared, resynchronization will take over and upon completion, the system will have migrated to the lower order cluster shown in FIG. 10D. This process may be repeated as many times as necessary without prejudice to performance.

Figure 11:
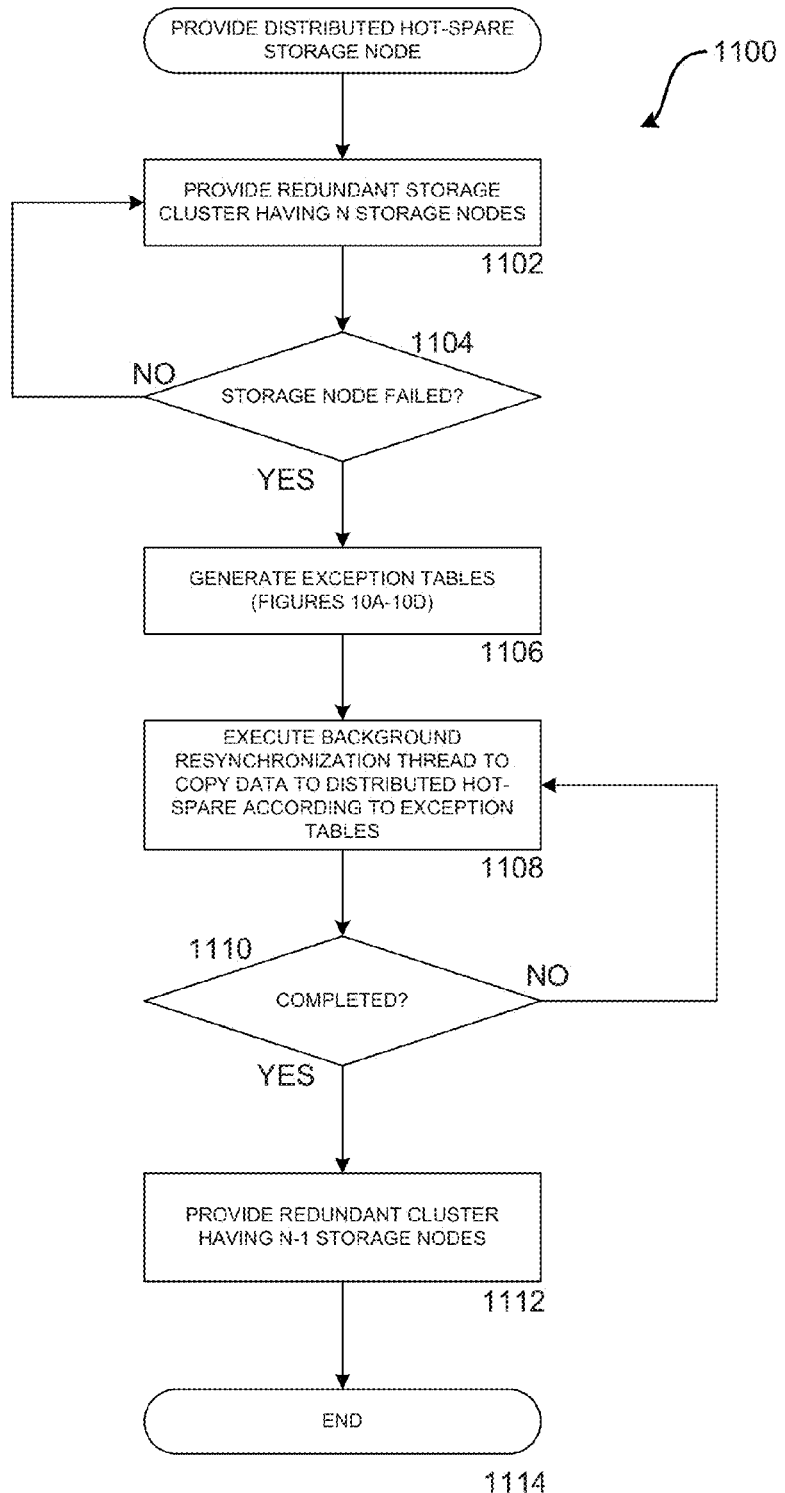
FIG. 11 is a flow diagram showing an illustrative process for providing a distributed hot-spare storage node in a storage cluster according to one embodiment described herein.

Referring now to FIG. 11, a routine 1100 will be described that illustrates one exemplary process for providing a distributed hot-spare storage node in a storage cluster according to one embodiment described herein. It should be appreciated that the logical operations of the various embodiments presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the embodiments described herein. Accordingly, the logical operations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 1100 begins at operation 1102, where a redundant chained declustered storage cluster having N storage nodes is provided. As discussed above, the storage cluster may utilize thin provisioning to allocate available storage space and may utilize an intelligent data placement algorithm such as DPA or m-DPA to arrange the data on disk. From operation 1102, the routine 1100 continues to operation 1104, where a determination is made as to whether one of the storage nodes in the storage cluster has failed. If not, the routine 1100 branches back to operation 1102, where the storage cluster continues to operate in a normal fashion with N nodes. If, however, a failure of one of the storage nodes is detected, the routine 1100 continues from operation 1104 to operation 1106.

At operation 1106, the exception tables are generated for the remaining storage nodes in the manner described above with reference to FIGS. 10A-10C. In this manner, the positive and negative tabs are created that specify how data is to be moved between the remaining nodes to reconstitute the cluster as a lower-order cluster. Once the exception tables have been generated, the routine 1100 continues to operation 1108, where the background resynchronization thread is executed to copy the data to the distributed hot-spare according to the data contained in the exception tables.

From operation 1108, the routine 1100 continues to operation 1110, where a determination is made as to whether the background resynchronization thread has completed. If not, the routine 1100 branches back to operation 1108, described above. If the background thread has completed, the routine 1100 continues to operation 1112, where the storage cluster is made available as a redundant storage cluster having N-1 storage nodes. It should be appreciated that the process shown in FIG. 11 may be performed for any cluster having at least three storage nodes. From operation 1112, the routine 1100 continues to operation 1114, where it ends.

Although the embodiments presented herein have been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

It should be also be appreciated that although simple cluster orders have been utilized herein for exemplary purposes, the embodiments presented herein may be utilized with a storage cluster containing any number of nodes, with data organized according to any placement algorithm (including RAID-10), and built with any kind of hardware, including RAID cards and storage servers.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for providing distributed hot-spare storage in a storage cluster, the method comprising:
    allocating unutilized space on all nodes in the storage cluster, the storage cluster having N storage nodes, wherein N is greater than or equal to three;
    detecting a failure of a storage node in the storage cluster; and
    in response to detecting the failure, reforming the storage cluster as a storage cluster having N-1 storage nodes using at least a portion of the unutilized space on the remaining storage nodes,
    wherein reforming the storage cluster comprises copying data that was mirrored on the failed storage node from the N-1 storage nodes to the at least a portion of the unutilized space on the remaining storage nodes, and
    wherein the distributed hot-spare storage node comprises the at least a portion of the unutilized storage space on the remaining storage nodes of the storage cluster.

2. The method of claim 1, wherein the data is stored on the storage cluster such that when the data that was mirrored on the failed storage node is copied from the N-1 storage nodes to the distributed hot-spare storage node an equal amount of data is copied from each of the N-1 storage nodes to the distributed hot-spare storage node.

3. The method of claim 2, wherein capacity on the storage cluster is allocated utilizing thin provisioning.

4. The method of claim 3, wherein copying the data that was mirrored on the failed storage node from the N-1 storage nodes to the distributed hot-spare storage node comprises:
    creating an exception table for the N-1 storage nodes of the storage cluster, the exception table identifying the areas of the N-1 storage nodes that need to be copied to the distributed hot-spare storage node; and
    executing a background process operative to copy the data from the N-1 storage nodes to the distributed hot-spare storage node according to the contents of the exception table.

5. The method of claim 1, wherein the storage cluster further comprises sufficient free storage space to store all of the data stored on the cluster, and wherein the method further comprises:
    repeatedly performing the reforming operation without user intervention in response to detecting the failure of a storage node in the storage cluster until the storage cluster has contracted from N nodes to two nodes.

6. The method of claim 1, wherein the reforming is performed without any quality of service loss at the storage cluster.

7. A non-transitory computer-readable medium having computer-executable instructions stored thereon which, when executed by a computer, cause the computer to:
- allocate unutilized space on all nodes in the storage cluster, the storage cluster having N storage nodes, wherein N is greater than or equal to three;
- detect a failure of a storage node in the storage cluster; and
- in response to a detection of the failure, reform the storage cluster as a storage cluster having N−1 storage nodes using at least a portion of the unutilized space on the remaining storage nodes,
- wherein reforming the storage cluster comprises copying data that was mirrored on the failed storage node from the N−1 storage nodes to the at least a portion of the unutilized space on the remaining storage nodes, and
- wherein the distributed hot-spare storage node comprises the at least a portion of the unutilized storage space on the remaining storage nodes of the storage cluster.

8. The non-transitory computer-readable medium of claim 7, wherein the data is stored on the storage cluster such that when the data that was mirrored on the failed storage node is copied from the N−1 storage nodes to the distributed hot-spare storage node an equal amount of data is copied from each of the N−1 storage nodes to the distributed hot-spare storage node.

9. The non-transitory computer-readable medium of claim 8, wherein capacity on the storage cluster is allocated utilizing thin provisioning.

10. The non-transitory computer-readable medium of claim 9, wherein copying the data that was mirrored on the failed storage node from the N−1 storage nodes to the distributed hot-spare storage node comprises:
- creating an exception table for the N−1 storage nodes of the storage cluster, the exception table identifying the areas of the N−1 storage nodes that need to be copied to the distributed hot-spare storage node; and
- executing a background process operative to migrate data from the N−1 storage nodes to the distributed hot-spare storage node according to the contents of the exception table.

11. The non-transitory computer-readable medium of claim 7, wherein the operation to reform the storage cluster is performed without any quality of service loss at the storage cluster.

12. A system for providing a distributed hot-spare storage node in a storage cluster, the system comprising:
- two or more storage nodes that together comprise a redundant storage cluster, the two or more storage nodes each having allocated therein unutilized space; and
- a distributed hot-spare storage node comprising at least a portion of the unutilized space from the two or more storage nodes,
- wherein the storage cluster is operative to detect a failure of one of the storage nodes and to reform itself following the failure as a redundant storage cluster having one less storage node utilizing the distributed hot-spare storage node, wherein data stored on the storage cluster is mirrored on two of the storage nodes, and wherein reforming the storage cluster comprises copying data that was mirrored on the failed storage node to the distributed hot-spare storage node.

13. The system of claim 12, wherein the data is stored on the storage cluster such that when the data that was mirrored on the failed storage node is copied from the storage nodes to the distributed hot-spare storage node an equal amount of data is copied from each of the storage nodes remaining in the cluster following the failure to the distributed hot-spare storage node.

14. The system of claim 13, wherein the storage cluster is operative to allocate requests to store data to the storage nodes utilizing thin provisioning.

15. The system of claim 14, wherein copying the data that was mirrored on the failed storage node from the storage nodes to the distributed hot-spare storage node comprises:
- creating an exception table for the storage nodes of the storage cluster, the exception table identifying the areas of the storage nodes that need to be copied to the distributed hot-spare storage node; and
- executing a background process operative to migrate data from the storage nodes to the distributed hot-spare storage node according to the contents of the exception table.

16. The system of claim 12, wherein the operation to reform the storage cluster is performed without any quality of service loss at the storage cluster.

* * * * *